United States Patent
Chen et al.

(10) Patent No.: US 12,071,696 B2
(45) Date of Patent: Aug. 27, 2024

(54) PLATINUM OXIDE NANOPARTICLES FOR ELECTROCHEMICAL HYDROGEN EVOLUTION AND METHODS FOR MAKING AND USING THE SAME

(71) Applicant: The Regents of the University of California, Oakland, CA (US)

(72) Inventors: Shaowei Chen, Santa Cruz, CA (US); Forrest Nichols, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 18/449,110

(22) Filed: Aug. 14, 2023

(65) Prior Publication Data

US 2023/0383425 A1    Nov. 30, 2023

Related U.S. Application Data

(62) Division of application No. 17/076,004, filed on Oct. 21, 2020, now Pat. No. 11,767,602.

(60) Provisional application No. 62/924,573, filed on Oct. 22, 2019.

(51) Int. Cl.
| | |
|---|---|
| B01J 23/42 | (2006.01) |
| C25B 1/04 | (2021.01) |
| C25B 11/052 | (2021.01) |
| C25B 11/067 | (2021.01) |
| C25B 11/075 | (2021.01) |

(52) U.S. Cl.
CPC ............ C25B 11/052 (2021.01); C25B 1/04 (2013.01); C25B 11/067 (2021.01); C25B 11/075 (2021.01)

(58) Field of Classification Search
CPC .......... B01J 23/42; C25B 1/04; C25B 11/052; C25B 1/075
See application file for complete search history.

(56) References Cited

U.S. PATENT DOCUMENTS

| | | | |
|---|---|---|---|
| 5,456,986 A | 10/1995 | Majetich et al. | |
| 5,573,864 A | 11/1996 | Kreider | |
| 5,776,615 A | 7/1998 | Wong et al. | |
| 5,840,435 A | 11/1998 | Lieber et al. | |
| 5,981,094 A * | 11/1999 | Teter ..................... | C04B 35/645 423/406 |
| 6,428,762 B1 * | 8/2002 | Khabashesku ......... | B82Y 30/00 423/384 |
| 8,133,637 B2 | 3/2012 | Sun et al. | |
| 8,962,512 B1 | 2/2015 | Burton et al. | |
| 9,421,520 B2 | 8/2016 | Li et al. | |
| 9,545,670 B2 | 1/2017 | Drzal et al. | |
| 9,694,346 B2 * | 7/2017 | Peng ....................... | B01J 23/38 |
| 10,384,193 B2 | 8/2019 | Nguyen et al. | |
| 10,549,266 B2 | 2/2020 | Liao et al. | |
| 10,661,257 B2 * | 5/2020 | Shuai ...................... | B01J 27/14 |

(Continued)

OTHER PUBLICATIONS

M. M. Hand, et al. "Renewable Electricity Futures Study vol. 1: Exploration of High-Penetration Renewable Electricity Futures", eds, National Renewable Energy Laboratory 2012, vol. 1-4.

(Continued)

*Primary Examiner* — Cam N. Nguyen
(74) *Attorney, Agent, or Firm* — Carter, DeLuca & Farrell LLP (57) ABSTRACT

The catalyst composition includes graphitic carbon nitride and a plurality of platinum oxide nanoparticles disposed on the graphitic carbon nitride.

13 Claims, 10 Drawing Sheets

(56) References Cited

U.S. PATENT DOCUMENTS

| | | | |
|---|---|---|---|
| 10,801,982 | B2 | 10/2020 | Ellis et al. |
| 11,063,253 | B2 | 7/2021 | Liu et al. |
| 11,219,892 | B2* | 1/2022 | Gilliland ............... B01J 37/035 |
| 11,413,603 | B2* | 8/2022 | Shuai ..................... B01J 35/392 |
| 11,524,280 | B2* | 12/2022 | Liao .................... H01M 4/8853 |
| 11,767,602 | B2 | 9/2023 | Chen et al. |
| 11,850,575 | B2* | 12/2023 | Shuai ...................... B01J 27/24 |
| 2008/0206484 | A1 | 8/2008 | Kostecki et al. |
| 2010/0041544 | A1* | 2/2010 | Hu .......................... B01J 27/24 |
| | | | 502/174 |
| 2011/0065570 | A1* | 3/2011 | Hu ....................... H01M 4/926 |
| | | | 977/773 |
| 2012/0028163 | A1 | 2/2012 | McGrath et al. |
| 2012/0208693 | A1 | 8/2012 | Zhang et al. |
| 2017/0232431 | A1 | 8/2017 | Jeong et al. |

OTHER PUBLICATIONS

J. Greeley, et al., "Computational high-throughput screening of electrocatalytic materials for hydrogen evolution", Nat Mater 2006, 5, 909-913.

D. Voiry, et al., "Enhanced catalytic activity in strained chemically exfoliated WS2 nanosheets for hydrogen evolution", Nat Mater 2013, 12, 850-855.

M. Cában-Acevedo, e tl. "Ecient hydrogen evolution catalysis using ternary pyrite-type cobalt phosphosulphide", Nat Mater 2015, 14, 1245.

A. Eftekhari, "Electrocatalysts for hydrogen evolution reaction", Int J Hydrogen Energy 2017, 42, 11053-11077.

C. Sealy, "The problem with platinum", Mater Today 2008, 11, 65-68.

Z. P. Zhao, "Surface-Engineered PtNi—O Nanostructure with Record-High Performace for Elctrocatalytic Hydrogen Evolution Reaction", J Am Chem Soc 2018, 140, 9046-9050.

Y. H. Li, et al., "Cluster Size Effects of Platinum Oxide as Active Sites in Hydrogen Evolution Reactions", Chem Eur J 2014, 20, 12377-12380.

M. Sarno, et al., "Much enhanced electrocatalysts of Pt/PtO2 and low platinum loading Pt/PtO2—Fe3O4 dumbbell nanoparticles", Int J Hydrogen Energy 2017, 42, 23631-23638.

X. Cheng, et al., "Highly active, stable oxidized platinum clusters as electrocatalysts for the hydrogen evolution reaction", Energy Environ. Sci. 2017, 10, 2450-2458.

J. Durst, et al., "New insights into the electrochemical hydrogen oxidation and evolution reaction mechanism", Energy Environ. Sci. 2014, 7, 2255-2260.

R. Subbaraman, et al., "Enhancing Hydrogen Evolution Activity in Water Splitting by Tailoring Li+—Ni(OH)2—Pt Interfaces", Science 2011, 334, 1256-1260.

L. Hui, et al., "Highly Efficient and Selective Generation of Ammonia and Hydrogen on a Graphdiyne-Based Catalyst", J Am Chem Soc 2019, 141, 10677-10683.

Y. Xue, et al., "Rationally engineered active sites for efficient and durable hydrogen generation", Nat. Commun. 2019, 10, 2281.

Y. Xue, et al., "Anchoring zero valence single atoms of nickel and iron on graphdiyne for hydrogen evolution", Nat. Commun. 2018, 9, 1460.

P. Xiao, et al., "Polymeric Carbon Nitride/Mesoporous Silica Composites as Catalyst Support for Au and Pt Nanoparticles", Chem Eur J 2014, 20, 2872-2878.

Y. Gong, et al., "Graphitic carbon nitride polymers promising catalysts or catalyst supports for heterogeneous oxidation and hydrogenation", Green Chem 2015, 17, 715-736.

W. A. Spieker, et al., "An EXAFS study of the co-ordination chemistry of hydrogen hexachloroplatinate(IV) 1. Speciation in aqueous solution", Appl. Catal. A—Gen. 2002, 232, 219-235.

K. Hindmarsh, et al., "The redox kinetics of platinum(H)/(IV) complexes", Inorg. Chim. Acta 1998, 278, 32-42.

B. He, et al., "Size control synthesis of polymer-stabilized water-soluble platinum oxide nanoparticles", J. Colloid Interface Sci. 2007, 308, 105-111.

W. Westwood, et al., "Formation of PtO films by reactive sputtering", J Appl Phys 1974, 45, 2313-2315.

S. Siegel, et al., "The Crystal Structure of Beta-Platinum Dioxide", J Inorg Nuclear Chem 1969, 31, 3803-3807.

A. Lazauskas, et al., "Characterization of urea derived polymeric carbon nitride and resultant thermally vacuum deposited amorphous thin films:Structural, chemical and photophysical properties", Carbon 2016, 107, 415-425.

M. Peuckert, et al., "XPS Study of the Electrochemical Surface Oxidation of Platinum in 1 N H2S04 Acid Electrolyte", Electrochim Acta 1984, 29, 1305-1314.

H. Karhu, et al., "XPS analysis of chlorine residues in supported Pt and Pd catalysts with low metal loading", Appl Catal A: Gen 2003, 247, 283-294.

Z. Q. Wang, et al., "A platinum oxide decorated amorphous cobalt oxide hydroxide nanosheet array towards alkaline hydrogen evolution", J Mater Chem A 2018, 6, 3864-3868.

D. A. Svintsitskiy, et al., "Highly Oxidized Platinum Nanoparticles Prepared through Radio-Frequency Sputtering: Thermal Stability and Reaction Probability towards CO", Chemphyschem 2015, 16, 3318-3324.

A. Thomas, et al., "Graphitic carbon nitride materials: variation of structure and morphology and their use as metal-free catalysts", J Mater Chem 2008, 18, 4893-4908.

J. H. Liu., "Simple pyrolysis of urea into graphitic carbon nitride with recyclable adsorption and photocatalytic activity", J Mater Chem 2011, 21, 14398-14401.

J. H. Thurston, et al., "Urea-derived graphitic carbon nitride (u-g-C3N4) films with highly enhanced antimicrobial and sporicidal activity", J. Colloid Interface Sci. 2017, 505, 910-18.

L. Chen, et al., "Platinum nanoparticles encapsulated in nitrogen-doped graphene quantum dots: Enhanced electrocatalytic reduction of oxygen by nitrogen dopants", Int J Hydrogen Energy 2017, 42, 29192-29200.

M. Ahmadi, et al., "Tailoring the Catalytic Properties of Metal Nanoparticles via Support Interactions", J Phys Chem Lett 2016, 7, 3519-3533.

C. H. Booth, R-Space X-ray Absorption Package. See: (http://lise.lbl.gov/RSXAP/), 2010.

J. A. Horsley, "Relationship between the area of L 2,3 x-ray absorption edge resonances and the d orbital occupancy n compounds of platinum and iridium", J Chem Phys 1982, 76, 1451-1458.

A. N. Mansour, et al., Quantitative Technique for the for the Determination of the Number of Unoccupied d-Electron States in a Platinum Catalyst Using the L2 X-ray Absorption Edge Spectra, J Phys Chem 1984, 88, 2330-2334.

D. Friebel, et al., "In situ X-ray probing reveals fingerprints of surface platinum oxide", Phys Chem Chem Phys 2011, 13, 262-266.

H. Yoshida, et al., "Quantitative determination of platinum oxidation state by XANES analysis", Phys Script 2005, T115, 813-815. https://materialsproject.org/materials/mp-4868/

M. R. Gao, et al., "Completely Green Synthesis of Colloid Adams-Catalyst a-PtO2 Nanocrystals and Derivative Pt Nanocrystals with High Activity and Stability for Oxygen Reduction", Chem Eur J 2012, 18, 8423-8429.

Y. Peng, et al., "Ruthenium Ion-Complexed Graphitic Carbon Nitride Nanosheets Supported on Reduced Graphene Oxide as High-Performance Catalysts for Electrochemical Hydrogen Evolution", Chemsuschem 2018, 11, 130-136.

Y. X. Zhan, et al., "Synthesis of a MoSx—O—PtOx Electrocatalyst with High Hydrogen Evolution Activity Using a Sacrificial Counter-Electrode", Adv Sci 2019, 6, 1801663.

M. K. Kundu, et al., Platinum Nanostructure/Nitrogen-Doped Carbon Hybrid:Enhancing its Base edia HER/HOR Activity through Bi-functionality of the Catalyst, Chemsuschem 2018, 11, 2388-2401.

* cited by examiner

PLATINUM OXIDE NANOPARTICLES FOR ELECTROCHEMICAL HYDROGEN EVOLUTION AND METHODS FOR MAKING AND USING THE SAME

CROSS-REFERENCE TO RELATED APPLICATION

This application is a divisional of U.S. application Ser. No. 17/076,004, filed on Oct. 21, 2020, which claims the benefit of and priority to U.S. Patent Provisional Application No. 62/924,573, filed on Oct. 22, 2019. The entire disclosures of the foregoing applications are incorporated by reference herein.

GOVERNMENT LICENSE RIGHTS

This invention was made with Government support under Grant Nos. CHE-1710408 & CHE-1900235, awarded by the National Science Foundation. The Government has certain rights in the invention.

BACKGROUND

Electrochemical hydrogen generation provides potential use for future renewable energy storage and conversion. By some estimates 80% of electricity generated in the United States has the potential to be made renewable by 2050. With the prospect of completely renewable electricity on the rise, electrochemical water splitting for hydrogen generation is a promising technology for sustainable energy storage and conversion. Implementation of this technology relies on improved catalyst design.

Hydrogen evolution reaction (HER) is an important process in electrochemical energy conversion and storage. HER plays a significant role in electrochemical water splitting for clean and sustainable hydrogen energy. HER may be summarized using Volmer, Heyrovsky, and Tafel reactions:

$$H_2O + * + e^- = H* + OH^- \text{(Volmer)} \quad (1)$$

$$H* + H_2O + e^- = H_2 + OH^- \text{(Heyrovsky)} \quad (2)$$

$$2H* = H_2 \text{(Tafel)} \quad (3)$$

with * being the active site.

Platinum remains a leading electrocatalyst for the multi-electron transfer process in HER, with a high exchange-current density and ideal Tafel slope. However, due to the high cost and low supply of platinum, there is a need to optimize its use in catalysts.

SUMMARY

The present disclosure provides catalyst compositions including platinum (Pt) oxide nanoparticles, which are deposited on graphitic carbon nitride (C3N4) nanosheets. C3N4 nanosheets may be first prepared through condensation of urea by a two-step route described below. The type of a catalyst substrate, e.g., C3N4, plays a role in the resulting particle size, stability and other factors, which affect the catalytic performance. C3N4 provides a suitable support for the fabrication of small metal oxide nanoparticle composites due to its surface functionality, ease and low cost of production, and inherent ability to control nanoparticle size.

The platinum oxide nanoparticles are deposited on C3N4 nanosheets by thermal refluxing of C3N4 and platinum chloride ($PtCl_2$) and/or platinum tetrachloride ($PtCl_4$) in water. The resulting catalyst composition exhibits electrocatalytic activity towards hydrogen evolution reaction (HER) in acid. The HER activity increases with increasing concentration of $Pt^{4+}$ species in the nanoparticles, and the optimized catalyst outperforms currently available commercial platinum-on-carbon (Pt/C) catalysts, exhibiting an overpotential of about −7.7 mV to reach the current density of 10 mA cm$^{-2}$ and a Tafel slope of about −26.3 mV dec$^{-1}$. Thus, the catalyst compositions according to the present disclosure maximize the $Pt^{4+}$ sites while minimizing the formation of the less active $Pt^{2+}$ species.

Highly oxidized platinum sites, e.g., $Pt^{4+}$ sites, can efficiently adsorb hydrogen onto the surface while minimizing the adsorption energy to allow for hydrogen gas formation and release from the surface of the catalyst composition. The present disclosure provides a process for controlling platinum oxidation states within the platinum oxide material to achieve effective catalyst design.

According to one embodiment of the present disclosure, a catalyst composition is provided. The catalyst composition includes graphitic carbon nitride and a plurality of platinum oxide nanoparticles disposed on the graphitic carbon nitride.

According to another embodiment of the present disclosure, a method for forming a catalyst composition is disclosed. The method includes suspending graphitic carbon nitride in water to form a suspension; adding a platinum halide salt to the suspension; and heating the suspension with the platinum halide salt to form a catalyst composition including a plurality of platinum oxide nanoparticles disposed on the graphitic carbon nitride.

According to one aspect of any of the above embodiments, each of the plurality of platinum oxide nanoparticles may be from about 1.0 nm to about 4.4 nm. The plurality of platinum oxide nanoparticles may have an average particle diameter from about 1.0 nm to about 3.0 nm. The catalyst composition may have an overpotential for reaching a current density of about 10 mA cm$^{-2}$ from about −5 mV to about −10 mV.

According to another aspect of any of the above embodiments, the catalyst composition may have a platinum loading from about 25% to about 35% by weight of the catalyst composition. The plurality of platinum oxide nanoparticles may include platinum 4+ species and platinum 2+ species. The platinum 4+ species and the platinum 2+ species may be present at a ratio from about 1.5:1 to about 1.75:1.

According to one aspect of the above embodiment, the method may further include: heating urea to a first temperature during a first period of time and to a second temperature during a second period of time to form the graphitic carbon nitride. The second temperature may be higher than the first temperature. The first temperature may be about 300° C. and the second temperature may be about 520° C. The first period of time may be about 3 hours and the second period of time may be about 4 hours.

According to another aspect of the above embodiment, in the method the platinum halide salt may be platinum chloride and/or platinum tetrachloride. Heating the suspension with the platinum halide salt may include heating the suspension to a temperature of about 90° C. for about 48 hours.

BRIEF DESCRIPTION OF DRAWINGS

Various embodiments of the present disclosure are described herein below with reference to the figures wherein.

DETAILED DESCRIPTION

The present disclosure is directed to a catalyst composition including a plurality of metallic nanoparticles disposed on a nanosheet. As used herein, the term "nanosheet" denotes a nanoscale sheet having a thickness from about 10 nm to about 1,000 nm and any suitable width and length larger than then thickness. As used herein, the term "nanoparticle" denotes a particle having any shape and size from about 1 nm to about 100 nm.

The nanosheet may be formed from carbon nitride (C3N4) by thermal treatment, namely, pyrolysis, of urea. Urea may be placed in a covered reaction vessel and heated to a first temperature from about 200° C. to about 400° C., which in embodiments may be about 300° C. Urea may be heated at a rate from about 1° C. per minute to about 5° C. per minute, and in embodiments may be heated at a rate of about 2° C. per minute. The first temperature may be held from about 1 hour to about 4 hours, and in embodiments may be held for about 3 hours. The resulting solid following the first heating step may then be collected and heated again in open atmosphere, e.g., air, to a second temperature, which is higher than the first temperature and may be from about 500° C. to about 600° C., and in embodiments may be about 520° C. The temperature may be held from about 3 hours to about 5 hours, and in embodiments may be about 4 hours. The resulting solid following the second heating step may then be washed, filtered, and dried to obtain the C3N4 nanosheet material.

Thereafter, nanoparticles may be formed and deposited on C3N4 to form the catalyst composition. Suitable nanoparticles may be formed from copper (Cu), silver (Ag), gold (Au), platinum (Pt), oxides or alloys thereof. C3N4 nanosheet materials may be dispersed or suspended in water, to which a metal halide salt may be added. The suspension may be heated to a temperature from about 80° C. to about 95° C. and in embodiments may be about 90° C. Suitable metal halides may include metal chlorides, such as platinum chloride ($PtCl_2$), platinum tetrachloride ($PtCl_4$), silver chloride ($AgCl_2$), silver tetrachloride ($AgCl_4$), gold chloride ($AuCl_3$), copper chloride ($CuCl_2$), and the like. In embodiments, combinations of different metal halide salts may be mixed. Metal halide may be mixed with the suspension from about 24 hours to about 72 hours, and in embodiments may be about 48 hours. Prior to mixing metal halide, the metal halide may be dissolved in hydrochloric acid (HCl) and the solution may then be neutralized by using an acid neutralizing agent, such as anhydrous sodium bicarbonate (NaHC$_3$), to achieve a pH of about 7. The dissolved metal from the metal halide forms metal oxide nanoparticles, which are then deposited on the nanosheet, thereby forming the catalyst composition.

In embodiments where the metal halide is a platinum halide, such as PtCl$_2$ or PtCl$_4$, the resulting nanoparticles may be platinum oxide nanoparticles being from about 1.0 nm to about 4.0 nm, with the average particle diameter from about 1.0 nm to about 3.0 nm. Platinum loading may be from about 25% to about 35% by weight of the catalyst composition, in embodiments from about 28% to about 32% by weight of the catalyst composition. The atomic ratio of platinum species in the nanoparticles, Pt4+:Pt2+, may be from about 0.4:1 to about 2.00:1, in embodiments the ratio may be from about 1.5:1 to about 1.75:1. In further embodiments, PtCl$_2$ and PtCl$_4$ may be mixed at different ratios to vary the ratio of Pt4+:Pt2+ in order to tailor HER activity of the catalyst composition. The HER activity of the catalyst composition according to the present disclosure may be expressed as an overpotential needed to reach a current density of about 10 mA cm$^{-2}$, η10, which may be from about −5 mV to about −10 mV.

The catalyst composition according to the present disclosure may be used in HER, a water splitting electrolysis reaction. The rate of hydrogen generation from the HER according to present disclosure may be affected by the pH and temperature at which HER is carried out. Accordingly, the HER may be carried out at a pH from about 1 to about 14, in embodiments, from about 9 to about 13, and in further embodiments, from about 10 to about 12. The HER may also be carried at a temperature from about 22° C. and 100° C., in embodiments from about 30° C. to about 80° C., and in further embodiments, from about 40° C. to about 60° C. HER may be carried with any suitable water, however, certain impurities present in the water may affect the rate of hydrogen generation.

The method for hydrogen generation according to the present disclosure includes providing the catalyst composition according to the present disclosure and exposing the catalyst composition to a hydrogen containing compound, such as water or an aqueous solution. Exposure to the compound may be carried by placing the catalyst composition in a liquid container.

The hydrogen containing compound may be an aqueous alkaline medium, which may be prepared by dissolving an alkaline compound including alkali metal hydroxides such as lithium hydroxide, sodium hydroxide and potassium hydroxide, and tetraalkylammonium hydroxides such as tetramethylammonium hydroxide and tetraethylammonium hydroxide. Suitable solvents include pure water or water that is mixed with various water-miscible solvents including alcohols such as methyl and ethyl alcohols, dimethylformamide, dimethylacetamide, ethyleneglycol, diethyleneglycol and the like. The aqueous alkaline medium may include from about 1% by to about 30% by weight of the alkaline compound dissolved therein. The generated hydrogen may be collected or syphoned for later use. In further embodiments, the generated hydrogen may be used directly with any system and or apparatus that utilizes hydrogen as a source of fuel, such as a fuel cell.

The following Examples illustrate embodiments of the present disclosure. These Examples are intended to be illustrative only and are not intended to limit the scope of the present disclosure. Also, parts and percentages are by weight unless otherwise indicated. As used herein, "room temperature" or "ambient temperature" refers to a temperature from about 20° C. to about 25° C.

EXAMPLES

Example 1

This example describes synthesis of C3N4, which is used as a substrate for forming a catalyst composition.

Figure 1A:
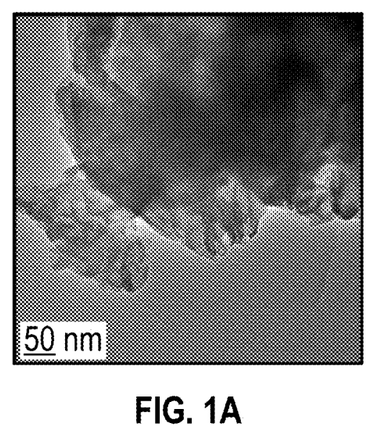
FIGS. 1A and B are transmission electron microscopy (TEM) images of graphitic carbon nitride at 50 nanometers (nm) scale and 5 nm scale, respectively, according to an embodiment of the present disclosure.
Figure 1B:
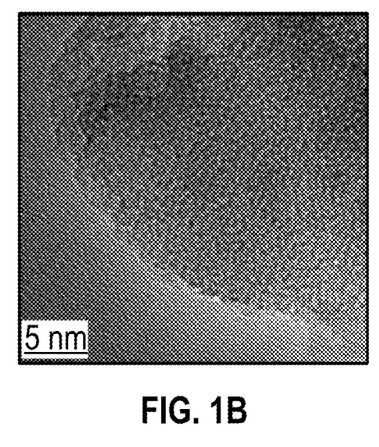

C3N4 was prepared by thermal treatment of urea. About 15 g of urea was placed in a crucible, covered, heated in air to 300° C. at a rate of 2° C. min$^{-1}$ and held for 3 h. The resulting white solid was ground to a fine powder, heated again in air to 520° C. at a rate of about 20° C. min$^{-1}$ and held for about 4 hours. The resulting light-yellow solid was collected and washed with water purified using NANOPURE™ water, filtered, and dried in a vacuum furnace for about 24 hours at approximately 60° C., providing C3N4 nanosheets. C3N4 nanosheets were imaged, which are shown in FIGS. 1A and B. TEM images of C3N4 nanosheets were carried out on a JOEL JEM 2100F microscope.

Example 2

This example describes deposition of platinum oxide nanoparticles on C3N4 to form the catalyst composition according to the present disclosure.

Platinum oxide deposition was performed by dispersing about 50 mg of C3N4 of Example 1 in about 50 mL of NANOPURE™ water under ultrasonication for about 1 hour. The resulting dispersion was then placed onto a hot plate under stirring. Two samples were prepared, a first sample of about 0.27 mmol of PtCl$_2$ and a second sample of about 0.27 mmol of PtCl$_4$. Each sample was slowly added to the stirring suspension and allowed to mix at about 90° C. for about 48 hours. In the case of PtCl$_2$, the salt was first dissolved in HCl and neutralized with anhydrous sodium carbonate to achieve a neutral pH before addition. The products were collected by centrifugation at about 4500 rpm for about 10 minutes, washed with NANOPURE™ water and acetone, and dried in a vacuum oven overnight.

The PtCl$_2$ sample was named Pt2+90C and formed the first plurality of platinum oxide nanoparticles and the PtCl$_4$ sample was named Pt4+90C and formed the second plurality of platinum oxide nanoparticles. The supernatant exhibited an orange color, indicative of an excess of platinum chloride in the solution, and became clear after washing, signifying effective removal of excess metal salts.

Example 3

This Example describes chemical analysis of the catalyst compositions of Example 2.

With reference to FIGS. 2A-D, TEM images Pt2+90C (FIGS. 2A-B) and Pt4+90C (FIGS. 2C-D) were obtained. The overall morphologies were consistent with those of C3N4 nanosheets (FIGS. 1A-B), displaying a layered, sheet-like structure. In the high resolution TEM images in FIGS. 2B and 2D, it can be seen that dark-contrast nanoparticles were produced and deposited on the C3N4 surface.

Figure 3A:
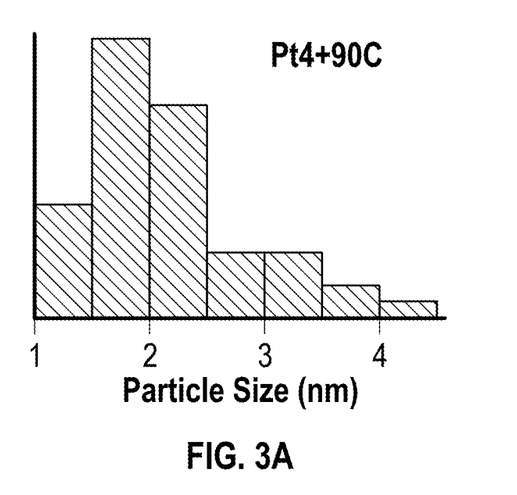
FIGS. 3A and B are core size histograms of first and second plurality of platinum oxide nanoparticles of FIGS. 2A-D according to an embodiment of the present disclosure.
Figure 3B:
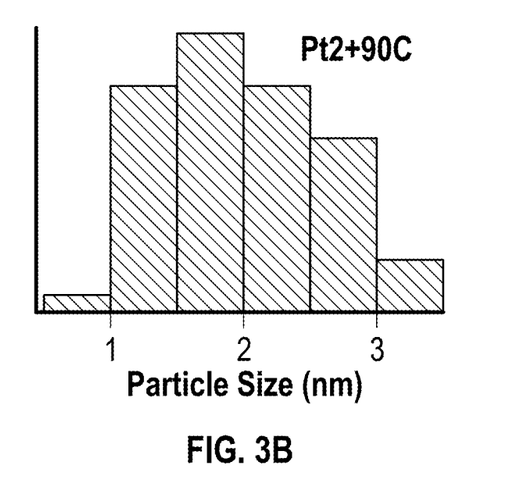

With reference to FIGS. 3A and B, which show core histograms of nanoparticle sizes for each of the samples Pt2+90C and Pt4+90C, the nanoparticles were from about 1.0 nm to about 4.0 nm, with the average particle diameter of about 2.0±0.6 nm for Pt2+90C and about 2.1±0.7 nm for Pt4+90C.

Furthermore, high resolution TEM images reveal clearly-defined lattice fringes of the nanoparticles (insets to FIGS. 2C and 2F), with an interplanar spacing of about 0.23 nm for Pt2+90C and about 0.24 nm for Pt4+90C, which are consistent with several crystalline facets, such as PtO(110), PtO2(011), and Pt(111). Yet, further characterizations also suggest that these are actually due to the formation of platinum oxide PtOx (vide infra).

Figure 2A:
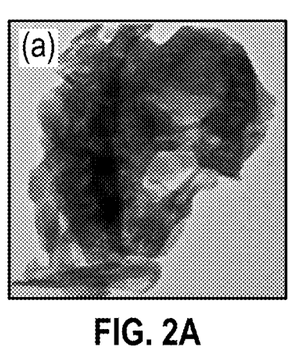
FIGS. 2A and B are TEM images of a first plurality of platinum oxide nanoparticles disposed on graphitic carbon nitride at 100 nm scale and 5 nm scale, respectively, according to an embodiment of the present disclosure.
Figure 2B:
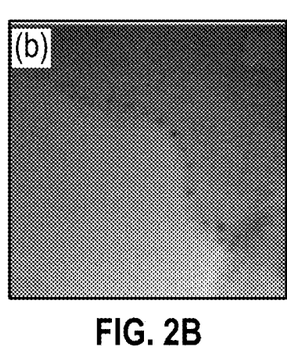
Figure 2C:
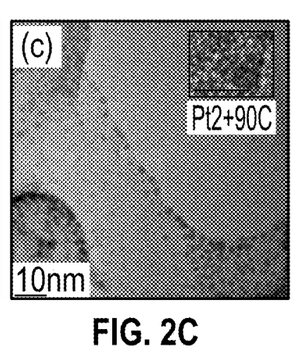
FIG. 2C is a TEM image of the first plurality of platinum oxide nanoparticles disposed on graphitic carbon nitride at 10 nm scale and an inset at 5 nm scale according to an embodiment of the present disclosure.
Figure 2D:
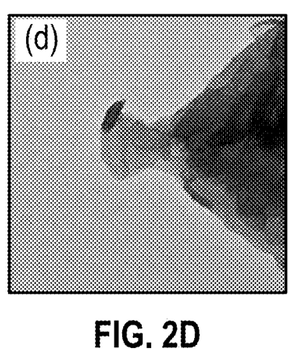
FIGS. 2D and E are TEM images of a second plurality of platinum oxide nanoparticles disposed on graphitic carbon nitride at 40 nm scale and 5 nm scale, respectively, according to an embodiment of the present disclosure.
Figure 2E:
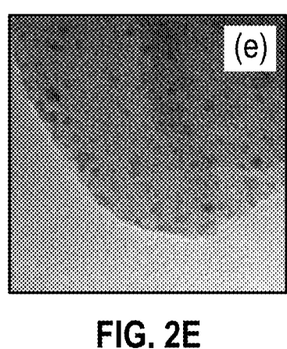
Figure 2F:
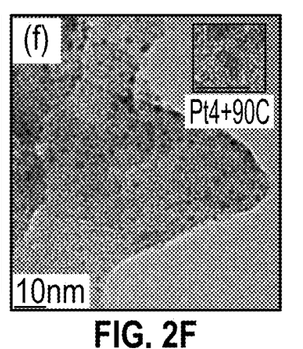
FIG. 2F is a TEM image of the second plurality of platinum oxide nanoparticles disposed on graphitic carbon nitride at 10 nm scale and an inset at 5 nm scale according to an embodiment of the present disclosure.
Figure 13:
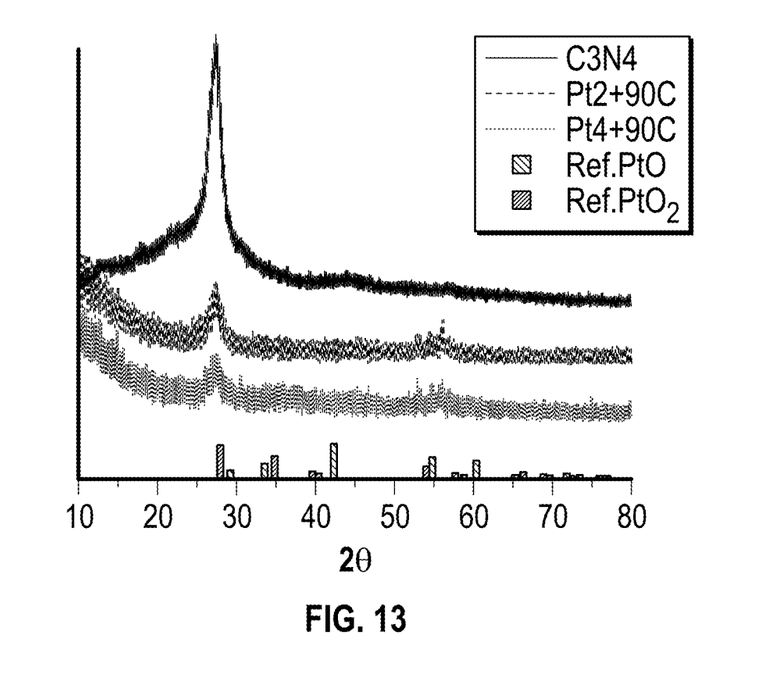
FIG. 13 is a plot of powder X-ray diffraction spectra, with tick lines representing expected patterns from that of $PtO_2$ and PtO.

Further structural insights were obtained in X-ray diffraction (XRD) measurements. With reference to FIG. 13, it was observed that Pt4+90C, Pt2+90C, and C3N4 all exhibited a single, major diffraction peak centered at about 2θ=27°, which can be assigned to the (002) crystalline facets of carbon nitride. In the Pt4+90C and Pt2+90C samples, the diffraction patterns of platinum oxide cannot be resolved, in comparison to the standard references of PtO (reference code 00-027-1331) and $PtO_2$ (reference code 01-075-0978), most likely due to the small nanoparticle size, as seen in TEM measurements (FIGS. 2C and 2F).

XPS measurements were then carried out to determine the chemical composition and electronic environment of the material. X-ray photoelectron spectroscopy (XPS) measurements were performed with a Phi 5400/XPS instrument equipped with an Al $K_\alpha$ source operated at about 350 W and $10^{-9}$ Torr. As shown in the survey spectra of FIG. 4A, two major peaks can be seen at about 288 eV and about 399 eV, which are attributable to C 1s and N 1s electrons of C3N4, respectively. For Pt2+90C and Pt4+90C samples two additional species were also identified at about 75 eV for Pt 4f electrons and about 532 eV for O 1s electrons, indicating the successful deposition of platinum species onto the C3N4 surface. Small peaks at about 199 eV and 270 eV are attributable to Cl 2p and Cl 2s electrons, respectively, due to residual chloride in the samples. Based on the integrated peak areas, the Pt loading was found to be comparable, namely, at about 32% by weight of the catalyst composition for Pt4+90C and about 28% by weight of the catalyst composition for Pt2+90C.

Figure 4A:
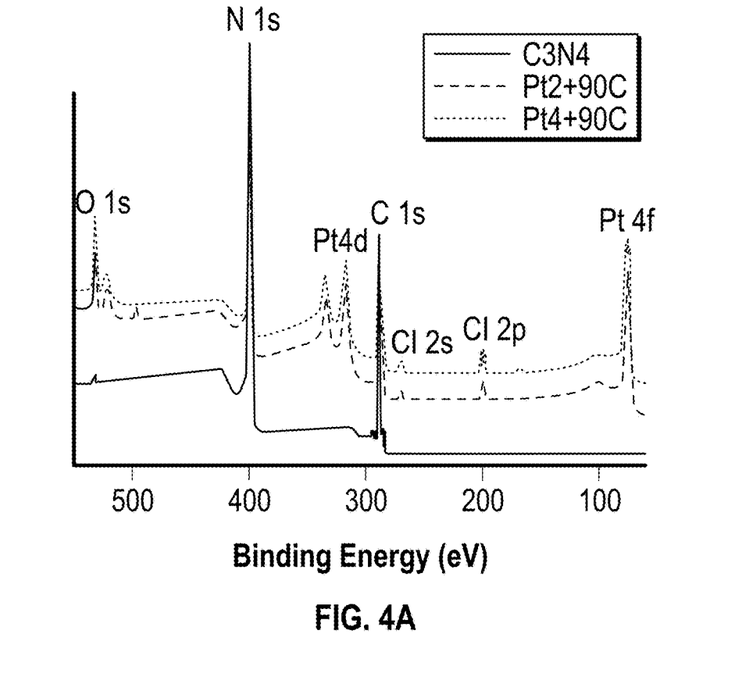
FIG. 4A are X-ray photoelectron spectra (XPS) plots of Pt4f electrons of graphitic carbon nitride, the first plurality of platinum oxide nanoparticles, and the second plurality of platinum oxide nanoparticles, according to an embodiment of the present disclosure.
Figure 4B:
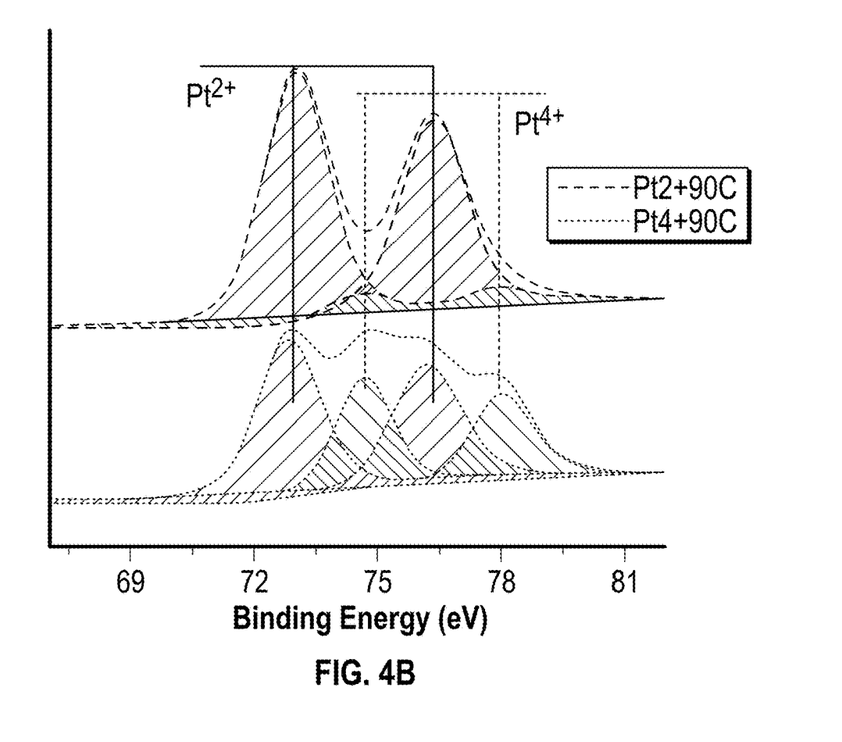
FIG. 4B are high-resolution scans for platinum 4f electrons of the first plurality of platinum oxide nanoparticles and the second plurality of platinum oxide nanoparticles, according to an embodiment of the present disclosure.

With reference to FIG. 4B, which shows corresponding high-resolution XPS scans of the Pt 4f electrons, the Pt2+90C sample (top curve) exhibited two doublets. The first pair of peaks at about 76.3 eV and about 73.0 eV corresponding to the 4f5/2 and 4f7/2 electrons of Pt2+. The other pair of peaks at about 78.0 eV and about 74.7 eV to those of Pt4+ electrons and a peak splitting of about 3.3 eV is consistent with Pt 4f spin-orbit coupling. Additionally, based on the integrated peak areas, the atomic ratio of Pt4+:Pt2+ in Pt2+90C was estimated to be about 0.45:1.

Similar behavior was observed in the Pt4+90C sample, where the two doublets occurred at about 76.2 eV and about 72.9 eV as well as about 78.0 eV and about 74.7 eV, respectively. However, the ratio of Pt4+:Pt2+ was significantly higher at about 1.66:1, more than approximately 3.5 times that in Pt2+90C. Thus, the plots of FIG. 4A illustrate that refluxing of platinum chloride and C3N4 effectively led to the deposition of platinum oxide (PtOx) nanoparticles onto the C3N4 surface.

Figure 5A:
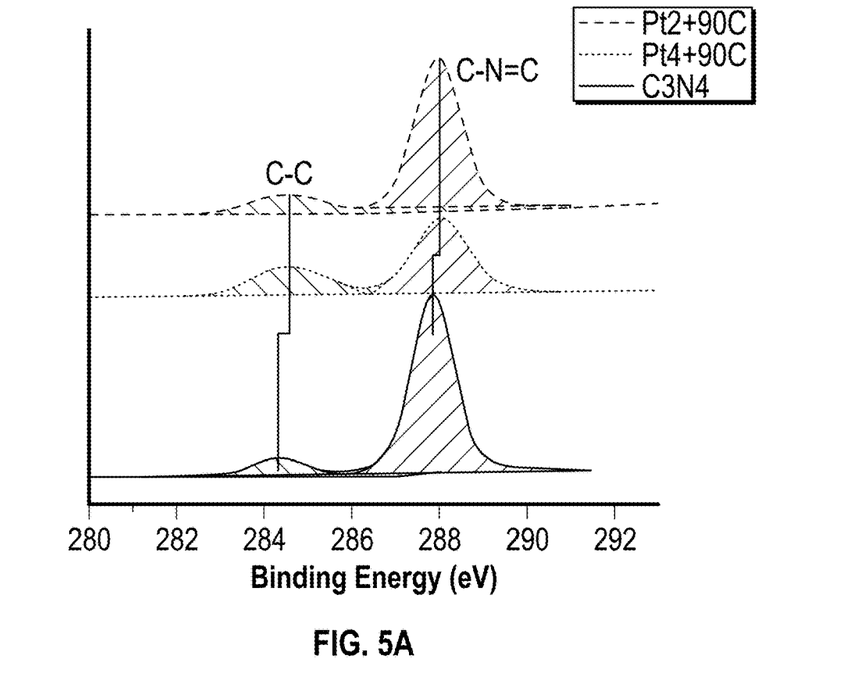
FIG. 5A are XPS spectra plots and high-resolution scans of carbon 1s electrons of graphitic carbon nitride, the first plurality of platinum oxide nanoparticles, and the second plurality of platinum oxide nanoparticles, according to an embodiment of the present disclosure.
Figure 5B:
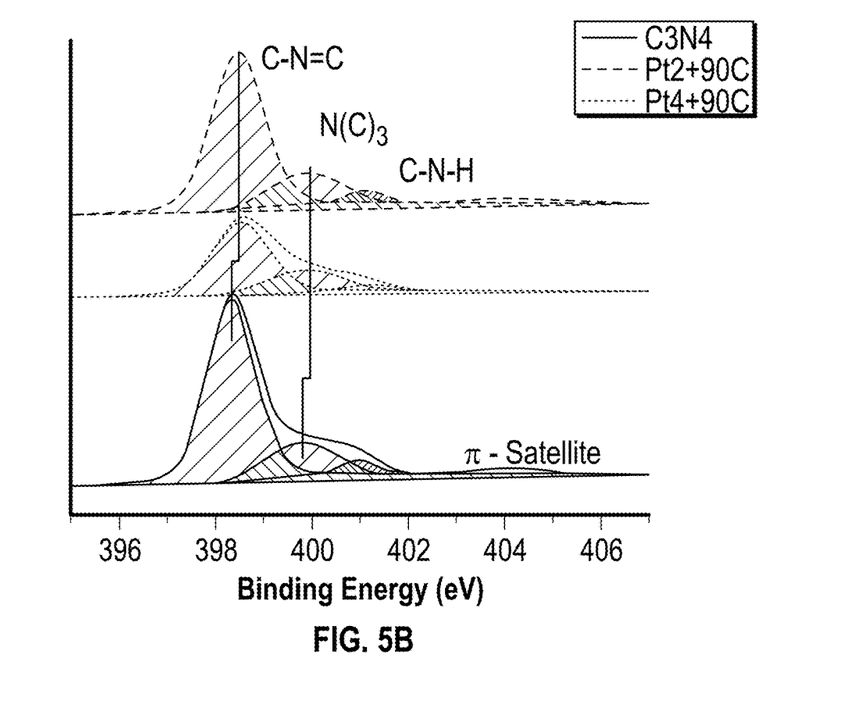
FIG. 5B are XPS spectra plots and high-resolution scans of nitrogen 1s of graphitic carbon nitride, the first plurality of platinum oxide nanoparticles, and the second plurality of platinum oxide nanoparticles, according to an embodiment of the present disclosure.

The high-resolution scans of the C 1s and N 1s electrons are depicted in FIG. 5. Deconvolution revealed two distinct peaks at about 287.85 eV and 284.33 eV for the C3N4 sample, which were attributed to the $sp^2$ hybridized carbon within the C3N4 network (C—N=C) and $sp^3$ carbon due to defect moieties (C—C), respectively. The nitrogen is region of C3N4 was deconvoluted into four components centered at approximately 398.34 eV, 399.81 eV, 400.96 eV, and a weak one at about 404.10 eV. These individual components were attributed to the $sp^2$ hybridized pyridinic nitrogen (C—N=C), $sp^3$ hybridized tertiary nitrogen (N—(C)$_3$), quaternary nitrogen (C—N—H), and a π-satellite excitation, respectively.

Upon thermal refluxing with platinum salts, the nitrogen and carbon peaks associated with the C3N4 matrix exhibited an increase in binding energy. The primary carbon peak shifted to 287.97 eV and 288.04 eV (C—N=C), and the defect carbon shifted to 284.53 eV and 284.57 eV (C—C) for Pt2+90C and Pt4+90C, respectively. The N 1s electrons also experienced a similar increase in binding energy with the three primary peaks centered at approximately 398.47 eV and 398.54 eV (C—N=C), 399.92 eV and 399.88 eV (N—(C)$_3$), 401.10 eV and 401.18 eV (C—N—H), corresponding to Pt2+90C and Pt4+90C, respectively. This slight increase in binding energy was attributed to electron donation from the C3N4 support to the Pt centers suggesting a strong interaction between the nanoparticles and C3N4.

Further structural insights were obtained in X-ray absorption spectroscopic (XAS) measurements, where data was collected at the Pt L3 edge to probe the Pt electronic states and investigate the local structures. X-ray absorption spectroscopy (XAS) measurements were performed at 10 K on beamline 4-1 at the Stanford Synchrotron Radiation Lightsource (SSRL) using an Oxford liquid helium cryostat.

Figure 6A:
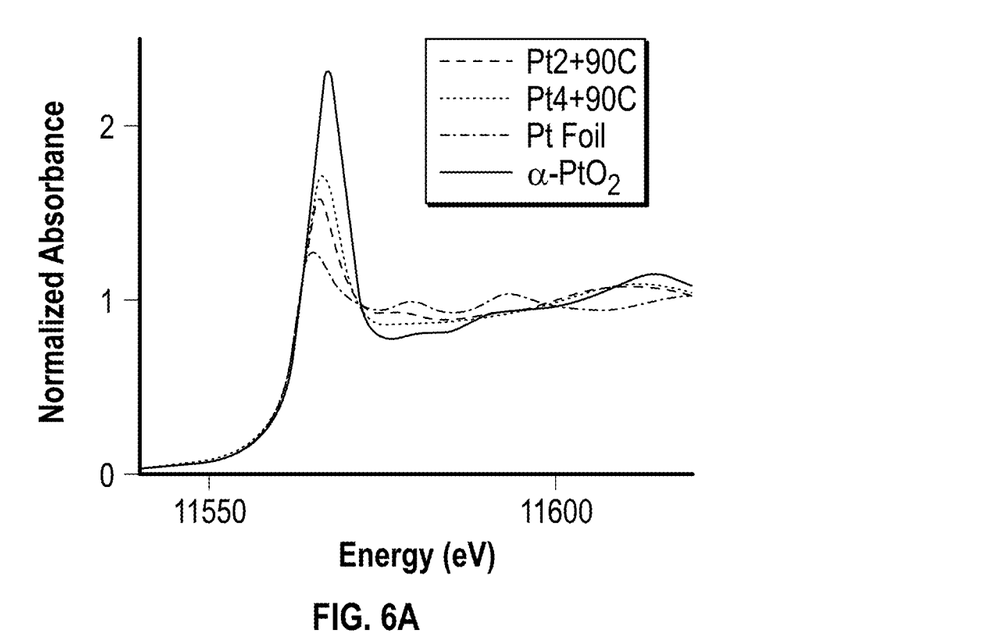
FIG. 6A shows plots of X-ray absorption near edge structure (XANES) data of platinum L3 for the first and second plurality of platinum oxide nanoparticles, platinum foil, and platinum oxide, according to an embodiment of the present disclosure.

The data were reduced and analyzed using the r-space X-ray absorption package (RSXAP). In FIG. 6A the Pt L3 XANES data for Pt2+90C and Pt4+90C were compared with those for a Pt foil and the $\alpha$-$PtO_2$ reference samples. All samples were electrically conductive and there was no shift of the main edge as typically observed for different valences in insulating materials, suggesting that the Fermi energies were nearly identical among the samples. A strong absorption in this region, referred to as the white line, was observed due to the Pt 2p→5d transitions. Typically, the white line intensity increases with decreasing 5d orbital occupancy (i.e., increasing valence states). In the present case, the white line intensity increased in the order of Pt foil<Pt2+90C<Pt4+90C<$PtO_2$, which indicated that the Pt charge state in Pt2+90C and Pt4+90C fell in the intermediate between Pt(0) and Pt(IV), and was higher in Pt4+90C than in Pt2+90C, in good agreement with results from XPS measurements (FIGS. 4A-B). Consistent behavior was also observed with the white line energy, which shifted positively in the order of Pt foil (11565.16 eV)<Pt2+90C (11566.00 eV)<Pt4+90C (11566.44 eV)<$\alpha$-$PtO_2$ (11567.27 eV).

Figure 6B:
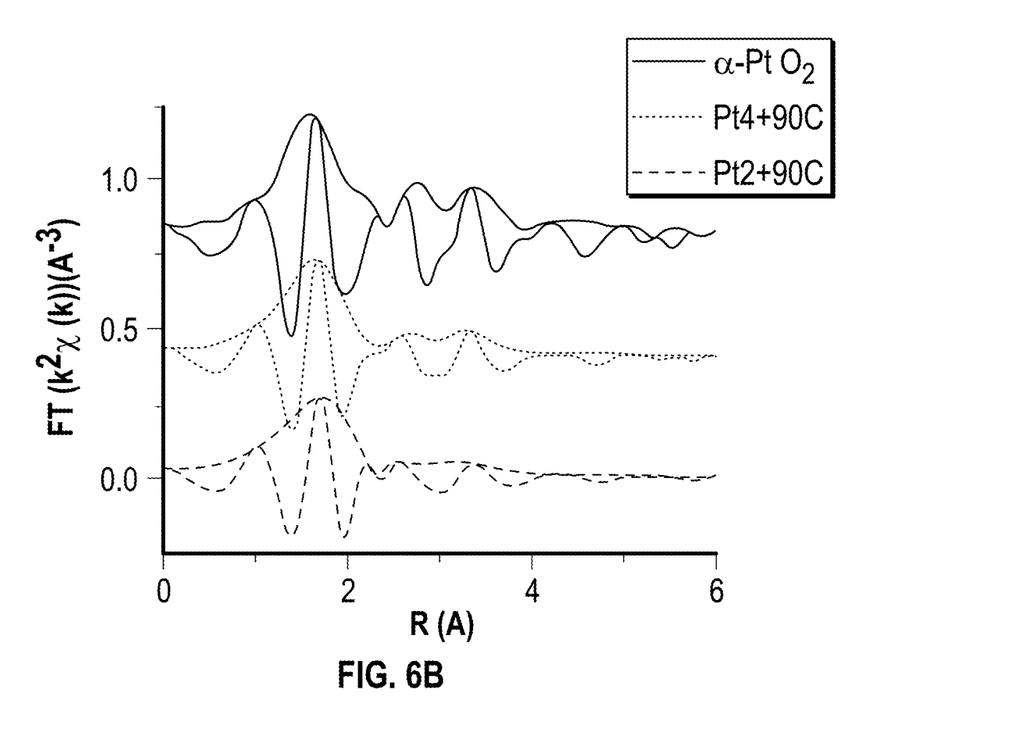
FIG. 6B shows plots of platinum L3 edge r-space data for the first and second plurality of platinum oxide nanoparticles, and platinum oxide, according to an embodiment of the present disclosure.
Figure 8:
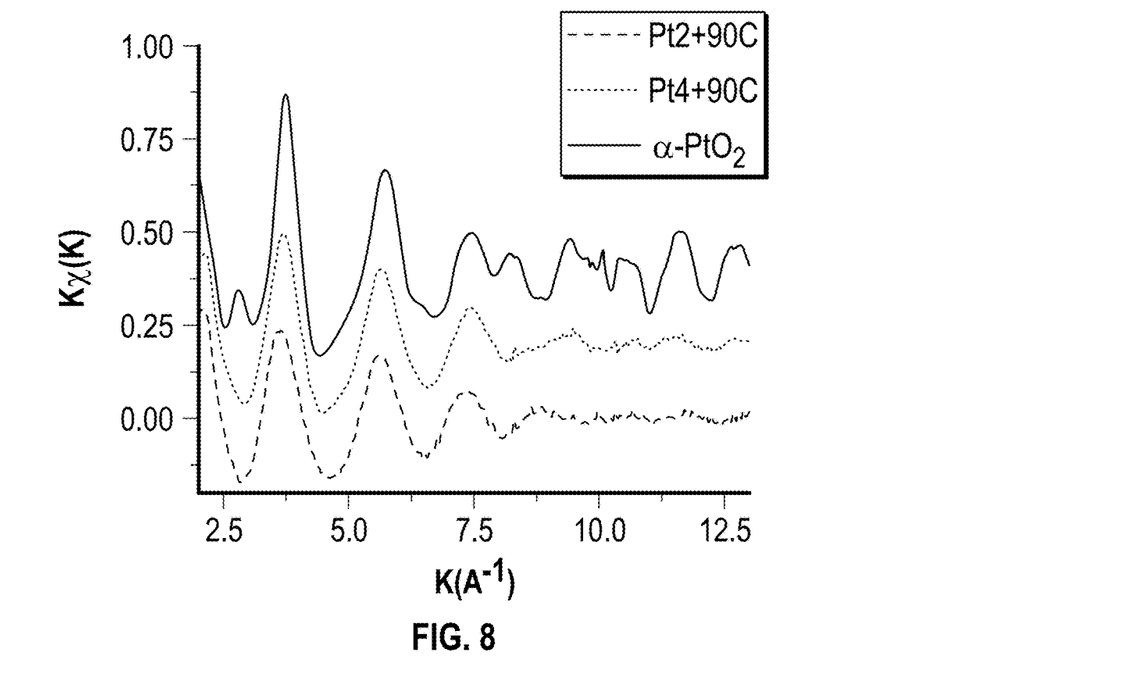
FIG. 8 shows plots of platinum L3 edge k-space data for the first and second plurality of platinum oxide nanoparticles and platinum oxide, according to an embodiment of the present disclosure.

EXAFS plots for Pt2+90C and Pt4+90C were then compared to that for $\alpha$-$PtO_2$ in FIG. 6B. The same FT range (from about 3.0 Å$^{-1}$ to about 10.8 Å$^{-1}$) was used for each plot although the k-space data for $\alpha$-$PtO_2$ extended to much higher k as shown in FIG. 8. The k-space plots showed increasing disorder from the reference sample to Pt2+90C. The double peak structure near 3 Å in FIG. 6B, associated with Pt—Pt second neighbor pairs in $\alpha$-$PtO_2$, was nearly washed out for the latter sample.

Figure 7A:
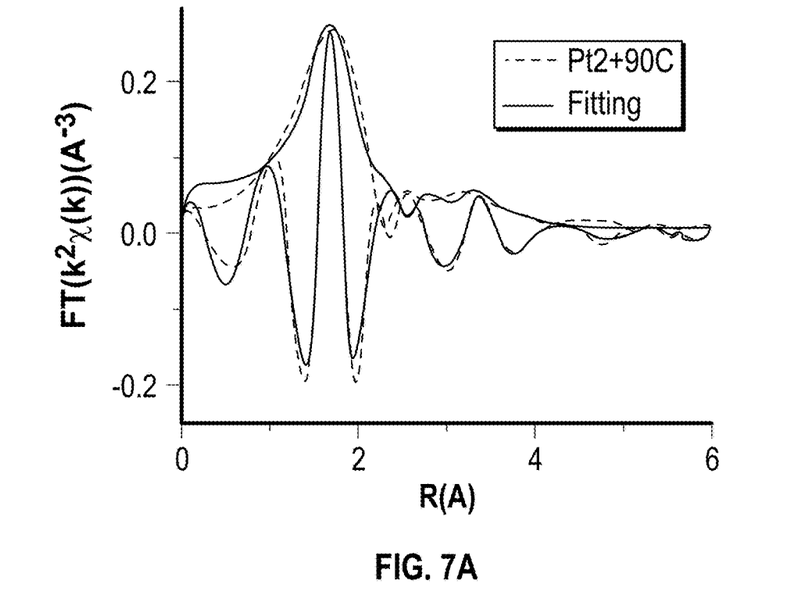
FIG. 7A is a plot of a fitting of a hexagonal structure of platinum oxide as a sum of platinum-oxygen and platinum-platinum bonds for the first plurality of platinum oxide nanoparticles, according to an embodiment of the present disclosure.
Figure 7B:
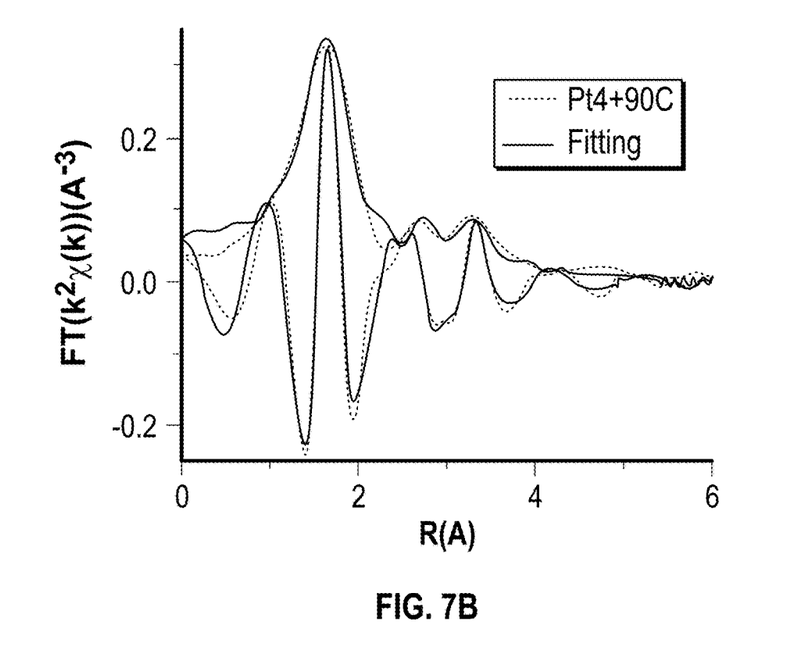
FIG. 7B is a plot of a fitting of a hexagonal structure of platinum oxide as a sum of platinum-oxygen and platinum-platinum bonds for the second plurality of platinum oxide nanoparticles, according to an embodiment of the present disclosure.

The reference $\alpha$-$PtO_2$ has a hexagonal structure; and the environment about Pt consists of 6 nearest-neighbor O atoms, six second-neighbor Pt atoms and six third-neighbor O atoms. To fit the data, theoretical Pt—O and Pt—Pt functions were calculated for $\alpha$-$PtO_2$ using FEFF7, plus a weak multiscattering peak, as shown in FIGS. 7A-B. The data were then fitted to a sum of such standards, allowing the pair distances and pair distribution widths, a, to vary. The third neighbor Pt—$O_2$ and the multiscattering peak amplitudes are very small and as such only the results for the first two neighbors were used. EXAFS fitting results to hexagonal α-PtO$_2$ are shown in Table 1, below, the Pt—O bond length was shorter for Pt4+90C than for Pt2+90C. A similar change was also observed for the second neighbors, again, consistent with a higher charge state of Pt in Pt4+90C than in Pt2+90C.

−26.1 mV for Pt/C and −214.6 mV for Pt2+90C, suggesting that Pt$^{4+}$ species played an important role in the HER activity. In addition, the Pt4+90C sample outperformed other platinum oxide based HER catalysts in acidic media that have been reported in recent literature as summarized in Table 2 below.

TABLE 2

| Catalyst | Platinum Composition | Catalyst Loading (mg/cm$^2$) | Electrolyte Solution | $\eta_{10}$ (mV) | Reference |
|---|---|---|---|---|---|
| Pt oxide C$_3$N$_4$ | Pt$^{2+}$/Pt$^{4+}$ | 0.24 | 0.5M H$_2$SO$_4$ | −7.7 | Present application |
| Pt/PtO2/Fe3O4 | Pt$^0$/Pt$^{2+}$/Pt$^{4+}$/Fe | — | 1.0M H$_2$SO$_4$ | >−10 | [1] |
| PtO$_x$/TiO$_2$ | Pt$^{2+}$/ Pt$^{4+}$/Ti | — | 0.5M H$_2$SO$_4$ | −150 | [2] |
| MoS$_x$—O—PtO$_x$ | Pt$^{2+}$/Pt$^{4+}$/MoS$_x$ | 0.45 | 0.5M H$_2$SO$_4$ | −25 | [3] |
| Pt—(PtO$_x$)—NSs/C | Pt$^0$/Pt$^{2+}$/Pt$^{4+}$ | 0.036 | 0.5M H$_2$SO$_4$ | −5 | [4] |

[1]M. Sarno, E. Ponticorvo, *Int J Hydrogen Energy* 2017, 42, 23631-23638.
[2]X. Cheng, Y. H. Li, L. R. Zheng, Y. Yan, Y. F. Zhang, G. Chen, S. R. Sun, J. J. Zhang, *Energy Environ. Sci.* 2017, 10, 2450-2458.
[3]Y. X. Zhan, Y. Li, Z. Yang, X. W. Wu, M. Z. Ge, X. M. Zhou, J. J. Hou, X. N. Zheng, Y. C. Lai, R. R. Pang, H. Duan, X. A. Chen, H. G. Nie, S. M. Huang, *Adv Sci* 2019, 6, 1801663.
[4]M. K. Kundu, T. Bhowmik, R. Mishra, S. Barman, *Chemsuschem* 2018, 11, 2388-2401.

TABLE 1

| Sample | Pt—O (Å) | Pt—Pt (Å) |
|---|---|---|
| Pt2 + 90C | 2.071 ± 0.01 | 3.204 ± 0.02 |
| Pt4 + 90C | 2.034 ± 0.01 | 3.154 ± 0.02 |

Example 4

This example describes analysis of electrocatalytic performance of catalyst compositions of Example 2.

Electrochemical measurements were performed with a CHI710 workstation, and electrochemical impedance measurements were carried out with a Gamry Reference 600 instrument. A glassy carbon electrode (5.60 mm in diameter, 0.246 cm$^2$) was used as the working electrode, while an Ag/AgCl (1.0 M potassium chloride (KCl)) electrode and graphite rod were used as the reference and counter electrodes, respectively. The Ag/AgCl electrode was calibrated versus a reversible hydrogen electrode (RHE) and all potentials in the present study were referenced to this RHE. In a typical experiment, about 2 mg of dry samples of catalyst compositions of Example 2 were mixed with about 3 mg of carbon black and sonicated for about 20 minutes in approximately 1 mL of isopropanol followed by an addition of about 40 μL NAFION™ (a sulfonated tetrafluoroethylene based fluoropolymer-copolymer) and sonicated for an additional 10 minutes. About 30 μL of the prepared ink was dropped onto the surface of the glassy carbon electrode and dried at room temperature, corresponding to a catalyst mass loading of about 0.244 mg cm$^{-2}$.

Figure 9A:
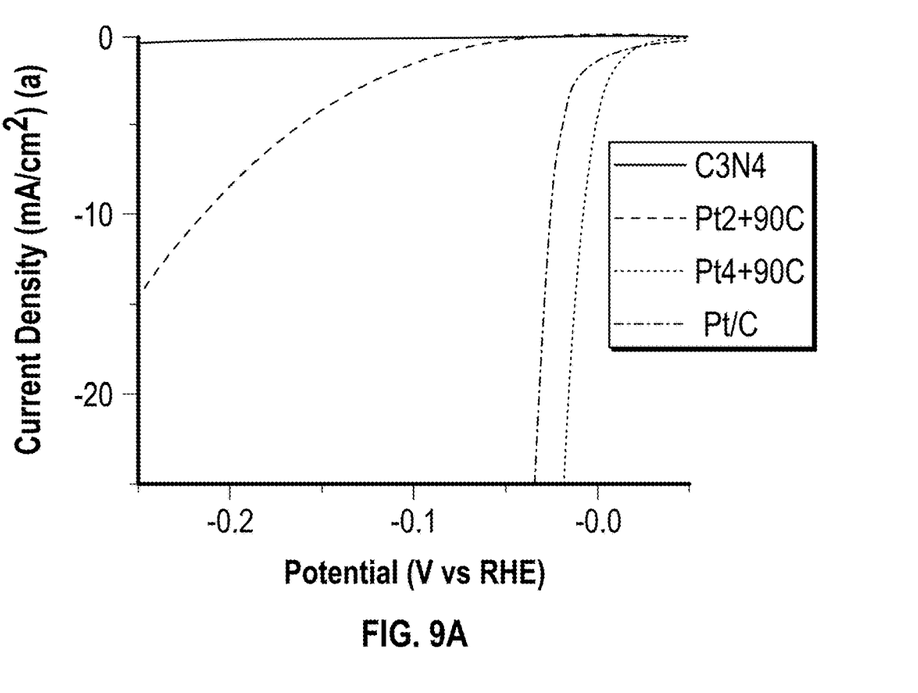
FIG. 9A is a plot of polarization curves of HER in 0.5M $H_2SO_4$ for graphitic carbon nitride, the first and second plurality of platinum oxide nanoparticles, and Pt/C catalyst, according to an embodiment of the present disclosure.
Figure 9B:
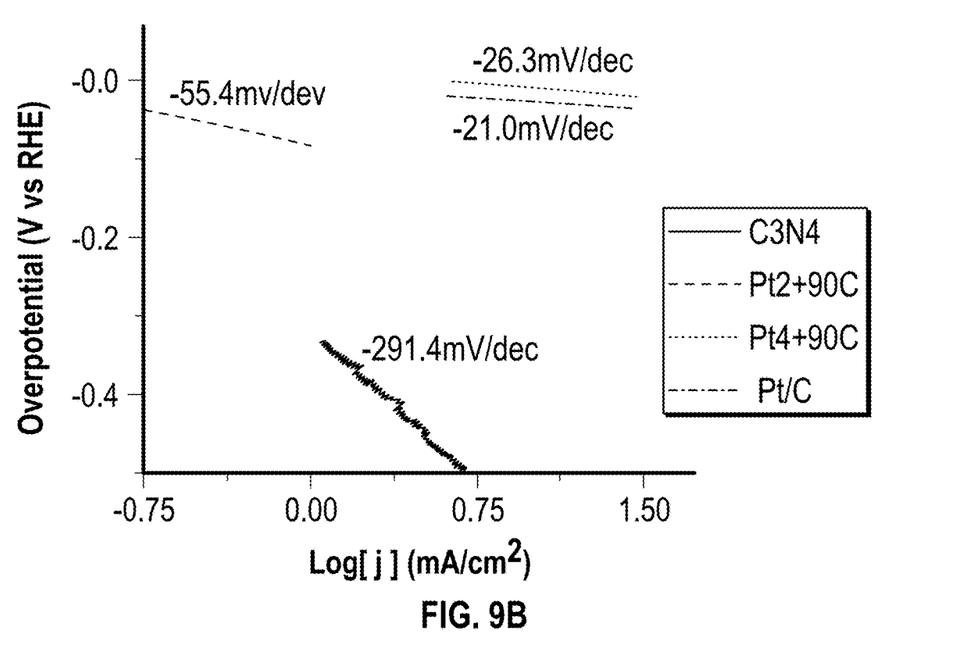
FIG. 9B is a plot of Tafel curves derived from the polarization curves of FIG. 9A.

To assess the electrocatalytic performance of these materials toward HER, linear sweep voltammetry was performed under a nitrogen atmosphere in 0.5 M H$_2$SO$_4$ at the potential scan rate of about 10 mV s$^{-1}$. FIG. 9A shows the polarization curves of Pt2+90C, Pt4+90C, and a commercially obtained platinum-on-carbon (Pt/C) catalyst, in comparison to that of C3N4. It can be seen that C3N4 exhibited essentially zero HER activity, whereas apparent catalytic activity occurred with the other three Pt-containing samples. At equivalent platinum mass loadings, Pt4+90C stood out as the best among the series, even outperforming commercial Pt/C, with an ultralow $\eta_{10}$ of about −7.7 mV, in comparison to To further understand the reaction mechanisms of these materials, Tafel plots were derived from the polarization curves, as shown in FIG. 9B, from which the Tafel slopes were estimated to be about 21.0 mV dec$^{-1}$ for Pt4+90C, about 26.3 mV dec$^{-1}$ for Pt/C, and about 55.4 mV dec$^{-1}$ for Pt2+90C. This suggests that kinetically Pt4+90C behaved similarly to Pt/C where the Tafel reaction was the rate determining step, while for Pt2+90C, HER is likely limited by the slower Heyrovsky reaction.

Figure 10:
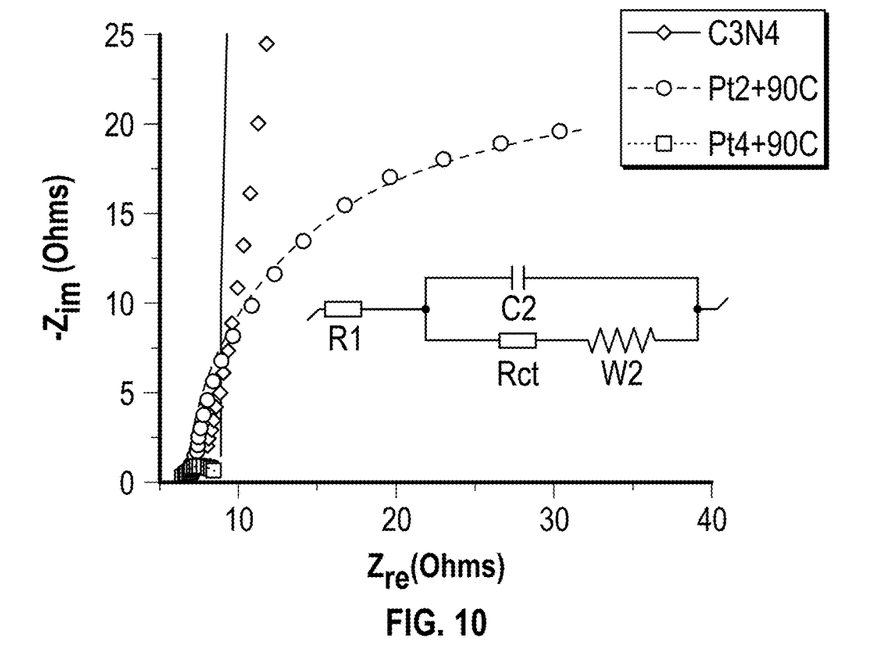
FIG. 10 is a plot of Nyquist curves of graphitic carbon nitride, the first and second plurality of platinum oxide nanoparticles, and Pt/C catalyst, according to an embodiment of the present disclosure.

FIG. 10 shows the Nyquist plots (squares) and the corresponding fits (solid lines) using a typical Randle's equivalent circuit modified with a Warburg diffusion term (W2). The charge-transfer resistances (R$_{CT}$) was estimated to be about 2230Ω for C3N4 and diminished markedly to about 26.8Ω for Pt2+90C, and about 1.6Ω for Pt4+90C. That is, the charge-transfer kinetics of HER was dramatically improved with the deposition of platinum onto C3N4, and the Pt4+90C sample showed the lowest charge transfer resistance among the series of samples.

Figure 9C:
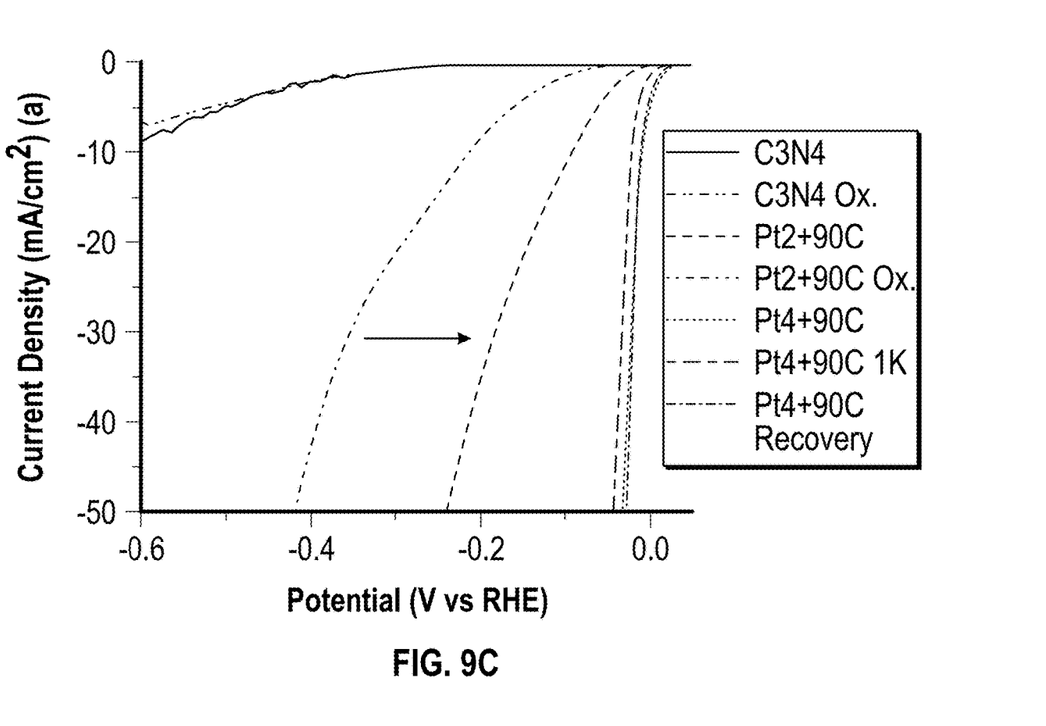
FIG. 9C is a plot of current density as a function of voltage potential illustrating oxidizing cycling, stability, and recovery tests for graphitic carbon nitride, the first and second plurality of platinum oxide nanoparticles, and Pt/C catalyst, according to an embodiment of the present disclosure.
Figure 11:
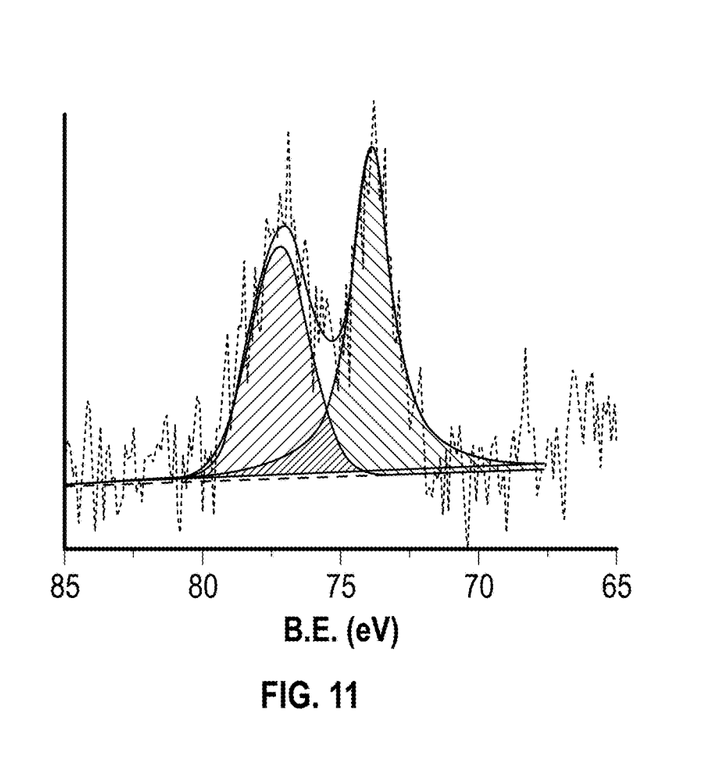
FIG. 11 is a plot of high resolution XPS scans of platinum 4f electrons of the first and second plurality of platinum oxide nanoparticles after 50 potential cycles between +0.9 and +1.2 V.

To further examine the influence of the Pt oxidation state on the HER performance, several additional electrochemical measurements were performed. In the first test, the Pt2+90C sample was found to show a marked improvement of the HER performance after 50 cycles at high potentials from about +0.9 V to about +1.2 V vs RHE at the potential rate of approximately 10 mV s$^{-1}$ (where Pt$^{2+}$ was electrochemically oxidized to Pt$^{4+}$). In FIG. 9C, $\eta_{10}$ diminished drastically from about 120 mV to about −93.8 mV. With reference to FIG. 11, XPS measurements show that the primary peak appeared at about 73.9 eV, about 0.9 eV higher than that of Pt2+90C and Pt4+90C, suggesting the formation of Pt$^{4+}$ species were responsible for the improved HER performance.

Figure 12:
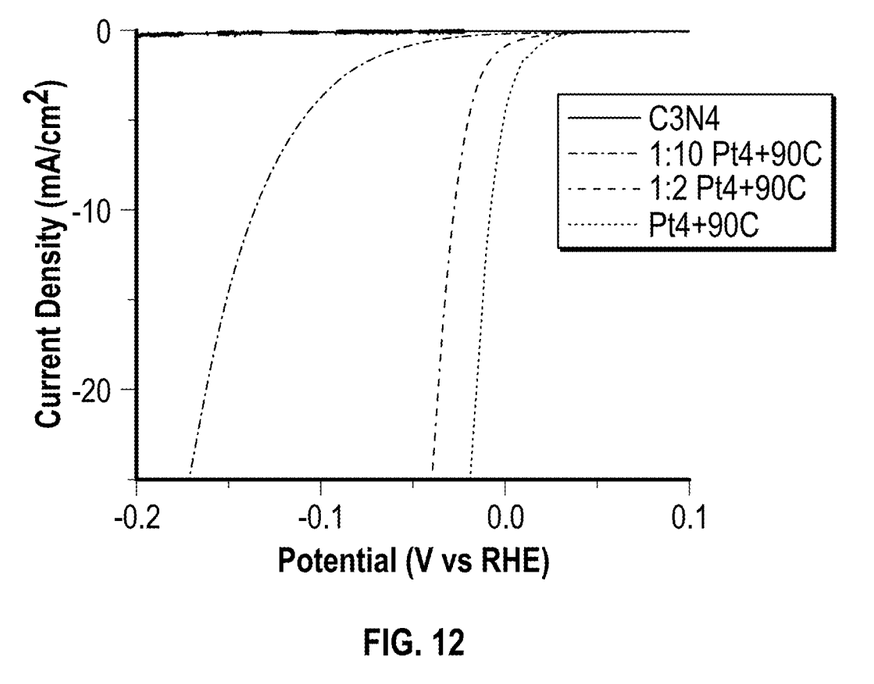
FIG. 12 is a plot of polarization curves of Pt4+90C prepared at reduced $PtCl_4$ loading in 0.5 M $H_2SO_4$.

Additional tests were carried out with Pt4+90C. When the catalyst was subject to potential cycling between 0 and +0.02V vs RHE for 1000 cycles at 10 mV s$^{-1}$ (where Pt$^{4+}$ was electrochemically reduced to lower valence states), $\eta_{10}$ in the subsequent HER measurement was found to deteriorate from about −7.7 mV to about −21.7 mV. However, after 50 potential cycles between +0.9 and +1.2 V, the HER performance was almost fully recovered, with $\eta_{10}$ being about −9.8 mV. In contrast, electrochemical treatment (reduction or oxidation) of C3N4 alone did not lead to any change of the electrochemical response, suggesting that it is the Pt species that is responsible for the HER activity and $Pt^{4+}$ is far more active than $Pt^{2+}$. In fact, the HER activity increases markedly with increasing $Pt^{4+}$ loading in the Pt4+90C sample as illustrated in FIG. 12, which shows plot of polarization curves of Pt4+90C) in 0.5 M $H_2SO_4$ prepared at reduced $PtCl_4$ loading, namely, about ½ and 1/10 of the loading described in Example 2.

As illustrated in the Examples above, PtOx nanoparticles were deposited onto C3N4 surfaces by thermal refluxing of C3N4 nanosheets and platinum chloride in water. The nanocomposites displayed similar platinum loading and particle size but with observable differences in the platinum valence states. It was shown that the platinum oxidation state greatly influenced the hydrogen evolution performance under electrochemical conditions, and platinum oxide nanoparticles in primarily a $4^+$ charge state exhibit HER performance superior to that of commercial platinum on carbon in acid media. The catalyst composition according to the present disclosure showed excellent stability and exceptional recoverability after recycling the material under oxidizing conditions. Accordingly, platinum oxide catalysts according to the present disclosure optimize the valence states of platinum by minimizing the formation of less oxidized, and less active species.

It will be appreciated that of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, or material.

What is claimed is:

1. A method for forming a catalyst composition, the method comprising:
    suspending graphitic carbon nitride in water to form a suspension;
    adding a platinum halide salt to the suspension; and
    heating the suspension with the platinum halide salt to form a catalyst composition including a plurality of platinum oxide nanoparticles disposed on the graphitic carbon nitride.

2. The method according to claim 1, further comprising:
    heating urea to a first temperature during a first period of time and to a second temperature during a second period of time to form the graphitic carbon nitride.

3. The method according to claim 2, wherein the second temperature is higher than the first temperature.

4. The method according to claim 3, wherein the first temperature is about 300° C. and the second temperature is about 520° C.

5. The method according to claim 2, wherein the first period of time is about 3 hours and the second period of time is about 4 hours.

6. The method according to claim 1, wherein the platinum halide salt is at least one platinum chloride or platinum tetrachloride.

7. The method according to claim 1, wherein each of the plurality of platinum oxide nanoparticles is from about 1.0 nm to about 4.0 nm.

8. The method according to claim 1, wherein the plurality of platinum oxide nanoparticles have an average particle diameter from about 1.0 nm to about 3.0 nm.

9. The method according to claim 1, wherein the catalyst composition has a platinum loading from about 25% to about 35% by weight of the catalyst composition.

10. The method according to claim 1, wherein the plurality of platinum oxide nanoparticles includes platinum 4+ species and platinum 2+ species.

11. The method according to claim 10, wherein the platinum 4+ species and the platinum 2+ species are present at a ratio from about 1.5:1 to about 1.75:1.

12. The method according to claim 1, wherein the catalyst composition has an overpotential for reaching a current density of about 10 mA $cm^{-2}$ from about −5 mV to about −10 mV.

13. The method according to claim 1, wherein heating the suspension with the platinum halide salt includes heating the suspension to a temperature of about 90° C. for about 48 hours.

* * * * *